US012574189B2

(12) United States Patent
Wei et al.

(10) Patent No.: US 12,574,189 B2
(45) Date of Patent: Mar. 10, 2026

(54) HARQ-ACK CODEBOOK DETERMINATION TECHNIQUES

(71) Applicant: ZTE Corporation, Shenzhen (CN)

(72) Inventors: Xingguang Wei, Shenzhen (CN); Xing Liu, Shenzhen (CN); Wei Gou, Shenzhen (CN); Shuaihua Kou, Shenzhen (CN); Xianghui Han, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 253 days.

(21) Appl. No.: 18/381,599

(22) Filed: Oct. 18, 2023

(65) Prior Publication Data

US 2024/0048335 A1 Feb. 8, 2024

Related U.S. Application Data

(63) Continuation of application No. PCT/CN2022/101587, filed on Jun. 27, 2022.

(51) Int. Cl.
*H04L 5/00* (2006.01)
*H04L 1/1812* (2023.01)
(Continued)

(52) U.S. Cl.
CPC .......... *H04L 5/0055* (2013.01); *H04L 1/1812* (2013.01); *H04W 72/12* (2013.01); *H04W 72/20* (2023.01)

(58) Field of Classification Search
None
See application file for complete search history.

(56) References Cited

U.S. PATENT DOCUMENTS 10,924,225 B2 2/2021 Tsai et al.
2020/0266937 A1 8/2020 Khoshnevisan et al.
(Continued)

FOREIGN PATENT DOCUMENTS

CN 111034093 A 4/2020
EP 3979729 A1 4/2022
WO 2020167612 A1 8/2020

OTHER PUBLICATIONS

European Search Report issued in EP Patent Application No. 22948232.8, dated Feb. 11, 2025, 10 pages.
(Continued)

*Primary Examiner* — Saumit Shah
(74) *Attorney, Agent, or Firm* — Perkins Coie LLP

(57) ABSTRACT

Techniques are described to determine HARQ-ACK codebook. An example wireless communication method includes receiving, by a communication device from a cell, control information that includes a field comprising a value, where the value indicates a current number of a control channel monitoring occasion that is associated with the cell and is to be monitored by the communication device, and where the current number of the control channel monitoring occasion is part of a series of numbers associated with a set of control channel monitoring occasions where control channels are received or are to be received from the cell; and transmitting one or more hybrid automatic repeat request acknowledgement (HARQ-ACK) information bits indicating whether a shared channel associated with the control channel monitoring occasion is received by the communication device or indicating that the communication device received the control information.

12 Claims, 9 Drawing Sheets

Receiving, by a communication device from a cell, control information that includes a field comprising a value — 802

Transmitting one or more hybrid automatic repeat request acknowledgement (HARQ-ACK) information bits indicating whether a shared channel associated with the control channel monitoring occasion is received by the communication device or indicating that the communication device received the control information — 804

(51) Int. Cl.
        *H04W 72/12*            (2023.01)
        *H04W 72/20*            (2023.01)

(56)                    References Cited

U.S. PATENT DOCUMENTS

| | | | |
|---|---|---|---|
| 2020/0358562 A1 | 11/2020 | Peng et al. | |
| 2021/0058189 A1 | 2/2021 | Xiao et al. | |
| 2022/0140954 A1 | 5/2022 | Kim et al. | |
| 2023/0139269 A1* | 5/2023 | MolavianJazi | H04L 5/0094 |
| | | | 370/329 |
| 2023/0371021 A1* | 11/2023 | Ye | H04L 5/0053 |
| 2024/0163020 A1* | 5/2024 | Wu | H04L 1/1896 |
| 2024/0313928 A1* | 9/2024 | Gao | H04L 1/189 |
| 2025/0039902 A1* | 1/2025 | Rastegardoost | H04W 72/0446 |

OTHER PUBLICATIONS

Huawei et al., "Remaining issues on cross-carrier scheduling with different numerology," 3GPP TSG RAN WG1 Meeting #101-e, R1-2003508, E-meeting, May 25-Jun. 5, 2020, 5 pages.

Huawei et al., "Corrections on cross-carrier scheduling with different numerology," 3GPP TSG RAN WG1 Meeting #100-e, R1-2001035, Feb. 24-Mar. 6, 2020, 9 pages.
Nokia et al., "Remaining details on NR-U HARQ scheduling and feedback," 3GPP TSG RAN WG1 #99, R1-1912261, Reno, USA, Nov. 18-22, 2019, 19 pages.
NEC, "UCI enhancements for NR URLLC," 3GPP TSG RAN WG1 #96, R1-1902531, Athens, Greece, Feb. 25-Mar. 1, 2019, 6 pages.
Oppo, "Text proposals for HARQ-ACK transmission," 3GPP TSG RAN WG1 Meeting #94bis, R1-1810982, Chengdu, China, Oct. 8-12, 2018, 2 pages.
European Communication under Rule 71(3) EPC issued in EP Patent Application No. 22948232.8, dated Jul. 8, 2025, 35 pages.
International Search Report and Written Opinion for International Application No. PCT/CN2022/101587, mailed on Dec. 21, 2022, 9 pages.
Panasonic, "HARQ enhancement for NTN," 3GPP TSG RAN WG1 #105e, R1-2105620, E-meeting, May 10-27, 2021, 10 pages.
Japanese office action issued in JP Patent Application No. 2024-542068, dated Jul. 10, 2025, 11 pages. English translation included.
Japanese notice of allowance issued in JP Patent Application No. 2024-542068, dated Dec. 8, 2025, 2 pages. English translation included.

* cited by examiner

700

Memory 705

Processor(s) 710

Transmitter 715

Receiver 720

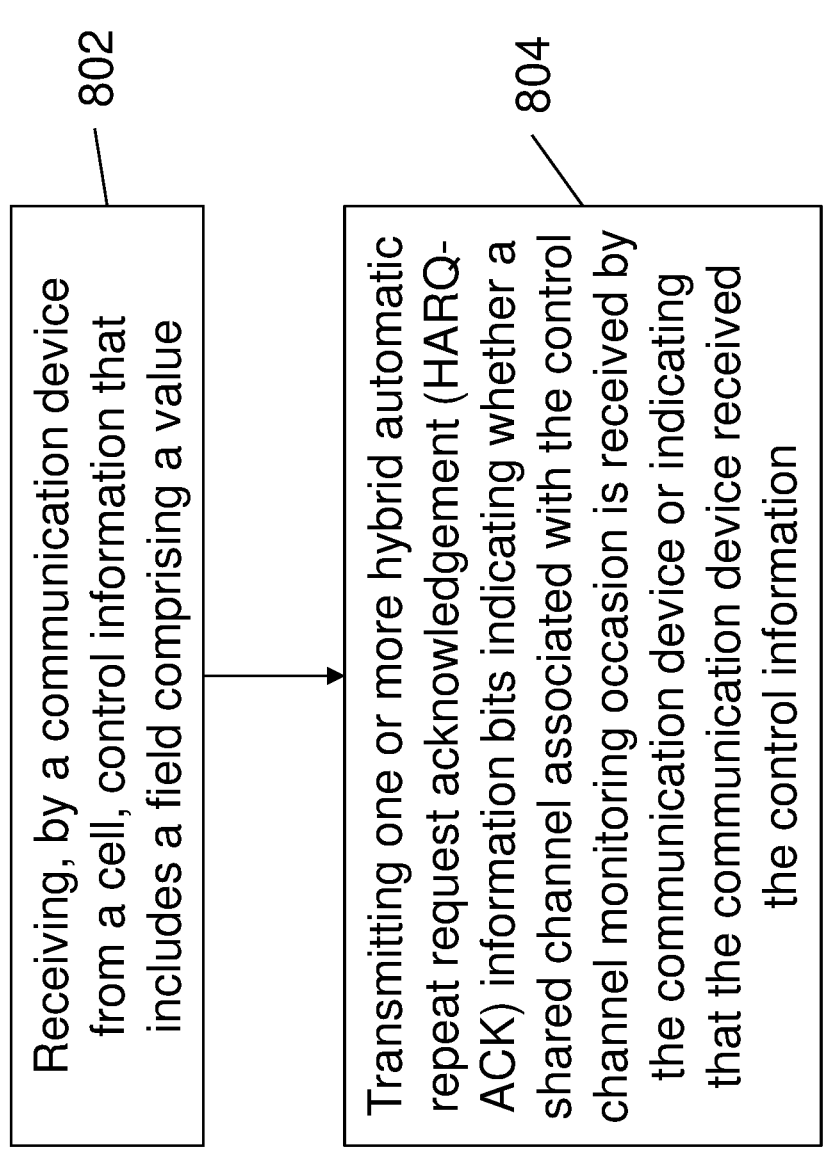

802

Receiving, by a communication device from a cell, control information that includes a field comprising a value

804

Transmitting one or more hybrid automatic repeat request acknowledgement (HARQ-ACK) information bits indicating whether a shared channel associated with the control channel monitoring occasion is received by the communication device or indicating that the communication device received the control information

FIG. 8

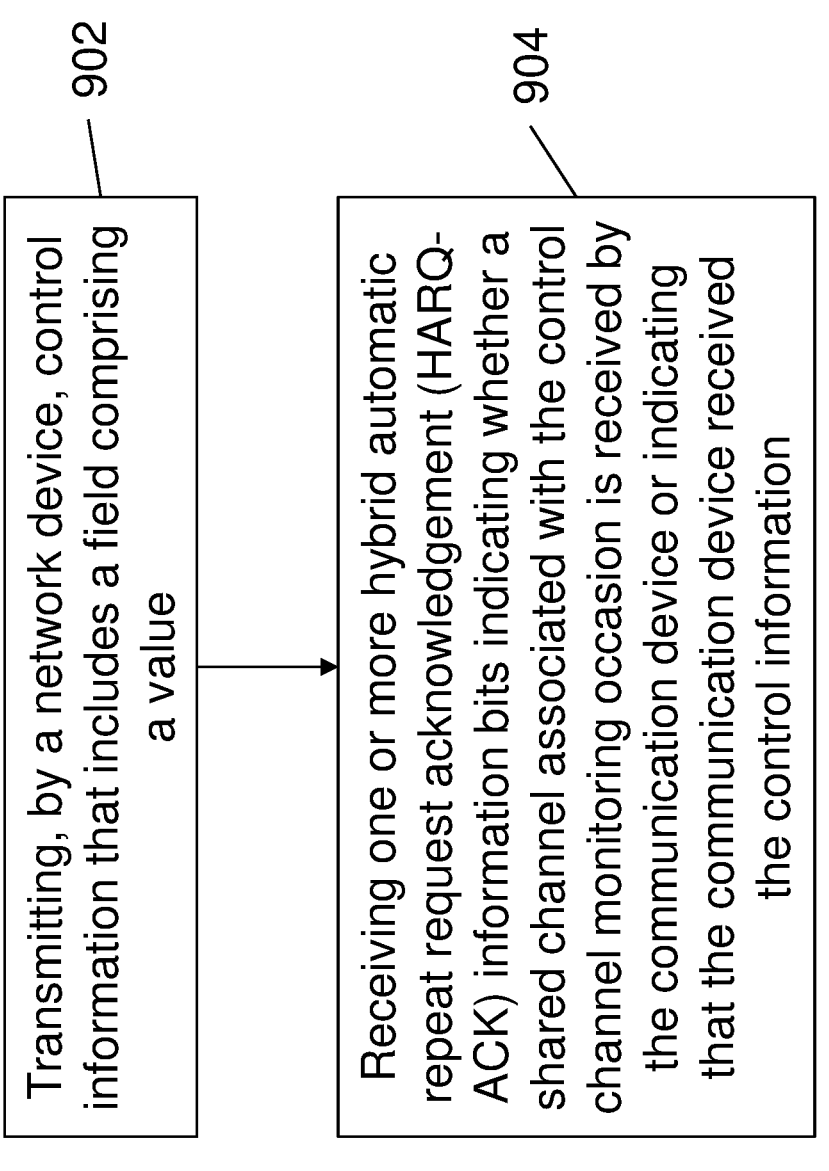

Transmitting, by a network device, control information that includes a field comprising a value

902

Receiving one or more hybrid automatic repeat request acknowledgement (HARQ-ACK) information bits indicating whether a shared channel associated with the control channel monitoring occasion is received by the communication device or indicating that the communication device received the control information

HARQ-ACK CODEBOOK DETERMINATION TECHNIQUES

CROSS-REFERENCE TO RELATED APPLICATIONS

This application is a continuation of International Patent Application No. PCT/CN2022/101587, filed on Jun. 27, 2022, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for transmitting and receiving HARQ-ACK information bits.

An example wireless communication method includes receiving, by a communication device from a cell, control information that includes a field comprising a value, where the value indicates a current number of a control channel monitoring occasion that is associated with the cell and is to be monitored by the communication device, and where the current number of the control channel monitoring occasion is part of a series of numbers associated with a set of control channel monitoring occasions where control channels are received or are to be received from the cell; and transmitting one or more hybrid automatic repeat request acknowledgement (HARQ-ACK) information bits indicating whether a shared channel associated with the control channel monitoring occasion is received by the communication device or indicating that the communication device received the control information.

In some embodiments, the value in the field indicates the current number of a control channel monitoring occasion that is associated with the cell, and the cell is a scheduling cell for one scheduled cell in a group of scheduled cells. In some embodiments, the value in the field indicates the current number of a control channel monitoring occasion that is associated with the cell and one or more other cells, and the cell is a scheduling cell for a group of scheduled cells that includes the cell and the one or more other cells. In some embodiments, the field is based on or indicates: a control channel monitoring occasion index of the control channel monitoring occasion, or a shared channel reception start time of the shared channel and the control channel monitoring occasion index of the control channel monitoring occasion, or the shared channel reception start time, an index of a serving cell, and the control channel monitoring occasion index of the control channel monitoring occasion. In some embodiments, the method further comprises receiving a second control information that includes a second field that includes a second value that indicates a total number of control channel monitoring occasions in the set of control channel monitoring occasions associated with the cell, where the transmitting the one or more HARQ-ACK information bits comprises: obtaining a multiplexed HARQ-ACK information bits by multiplexing a plurality of HARQ-ACK information bits that indicate whether a set of shared channels are received by the communication device and/or that the communication device received the control information, wherein the plurality of HARQ-ACK information bits comprise the one or more HARQ-ACK information bits; and transmitting the multiplexed HARQ-ACK information bits in an uplink shared channel scheduled by the control channel that includes the second field.

In some embodiments, the second value of the second field indicates the total number of control channel monitoring occasions in the set of control channel monitoring occasions associated with the cell that is a reference cell, the communication device determines one or more second values associated with one or more other cells based on the second value of the second field, and each of the one or more second values indicates a total number of control channel monitoring occasions in one set of control channel monitoring occasions associated with one of the one or more other cells. In some embodiments, the second field for the second value is a total downlink assignment indicator (T-DAI) field for the cell, the communication device determines a third value of a second T-DAI field based on the second value of the T-DAI field, the third value of the second T-DAI field indicates a second total number of control channel monitoring occasion in a second set of control channel monitoring occasions that are associated with a second cell and that are to be monitored by the communication device, and the second value is referred as Y and the third value is referred as X. In some embodiments, the X is equal to a largest value (X1) from the series of numbers associated with the set of control channel monitoring occasions where control channels are received or are to be received from the cell.

In some embodiments, X1 is a largest value from the series of numbers associated with the set of control channel monitoring occasions where control channels are received or are to be received from the cell, and in response to X being larger than X1, the communication device transmits a non-acknowledgement (NACK) value for HARQ-ACK information bits corresponding to a last X-X1 counter downlink assignment indicator (C-DAI) values in a HARQ-ACK codebook for at least some of the second set of control channel monitoring occasions. In some embodiments, $X=p*Y$, p is a scaling factor, and p is an integer larger than 0. In some embodiments, $X=\lfloor p*Y\rfloor$, p is a scaling factor, p is an integer or decimal number, and p is larger than 0. In some embodiments, p is determined by a sub-carrier spacing, a numerology corresponding to the sub-carrier spacing, a total number of control channel monitoring occasions, or PDCCH monitoring capability, or p is configured by a base station In some embodiments, $X=Y+q$, q is an integer, and q is determined by a sub-carrier spacing, a numerology corresponding to the sub-carrier spacing, a total number of control channel monitoring occasions or PDCCH monitoring capability, or q is configured by a base station. In some embodiments, $(X-1)$ mod $T+1=(Y-1)$ mod $T+1$, and T and N are integers. In some embodiments, T is an integer that is equal to $2^N$, and N is a number of bits for the field. In some embodiments, X, Y and N are integers larger than 0. In some embodiments, X is not smaller than the total number of control channel monitoring occasions in the set of control channel monitoring occasions where control channels are received. In some embodiments, the cell is a reference cell, the communication device determines not to generate or determines not to transmit feedback to the second cell in response to: the second value of the T-DAI field being larger than zero, and the communication device determining an absence of reception of one or more control channel from the second cell. In some embodiments, the cell is a reference cell, the communication device generates and transmits one bit of non-acknowledgement (NACK) information to the second cell in response to: the second value of the T-DAI field being larger than M, wherein M is an integer greater than zero, and the communication device determining an absence of reception of one or more control channel from the second cell.

In some embodiments, the cell is a reference cell, in response to determining an absence of reception of one or more control channels from the cell: the communication device determines not to generate or determines not to transmit feedback to the cell, and the communication device generates and transmits feedback to a second cell based on the value that indicates a second current number of a second control channel monitoring occasion that is associated with a second cell. In some embodiments, the cell is a reference cell, the method further comprises: receiving a second control information that includes a second field that includes a second value that indicates a total number of control channel monitoring occasions in the set of control channel monitoring occasions associated with the cell, in response to the second value being equal to zero: the communication device determines not to generate or determines not to transmit feedback to the cell, and the communication device generates and transmits feedback to a second cell based on the value that indicates a second current number of a second control channel monitoring occasion that is associated with a second cell. In some embodiments, the field includes a counter downlink assignment indicator (C-DAI) field. In some embodiments, the control information includes a downlink control information (DCI).

Another example wireless communication method includes transmitting, by a network device, control information that includes a field comprising a value, where the value indicates a current number of a control channel monitoring occasion that is associated with a cell of the network device and is to be monitored by a communication device, and where the current number of the control channel monitoring occasion is part of a series of numbers associated with a set of control channel monitoring occasions where control channels are transmitted or are to be transmitted from the cell to the communication device; and receiving one or more hybrid automatic repeat request acknowledgement (HARQ-ACK) information bits indicating whether a shared channel associated with the control channel monitoring occasion is received by the communication device or indicating that the communication device received the control information.

In some embodiments, the value in the field indicates the current number of a control channel monitoring occasion that is associated with the cell, and the cell is a scheduling cell for one scheduled cell in a group of scheduled cells. In some embodiments, the value in the field indicates the current number of a control channel monitoring occasion that is associated with the cell and one or more other cells, and the cell is a scheduling cell for a group of scheduled cells that includes the cell and the one or more other cells. In some embodiments, the field is based on or indicates: a control channel monitoring occasion index of the control channel monitoring occasion, or a shared channel reception start time of the shared channel and the control channel monitoring occasion index of the control channel monitoring occasion, or the shared channel reception start time, an index of a serving cell, and the control channel monitoring occasion index of the control channel monitoring occasion. In some embodiments, the method further comprises transmitting a second control information that includes a second field that includes a second value that indicates a total number of control channel monitoring occasions in the set of control channel monitoring occasions associated with the cell, where the receiving the one or more HARQ-ACK information bits comprises: receiving multiplexed HARQ-ACK information bits in an uplink shared channel scheduled by the control channel that includes the second field, wherein the multiplexed HARQ-ACK information bits comprise a plurality of HARQ-ACK information bits that indicate whether a set of shared channels are received by the communication device and/or that the communication device received the control information, and the one or more HARQ-ACK information bits.

In some embodiments, the second value of the second field indicates the total number of control channel monitoring occasions in the set of control channel monitoring occasions associated with the cell that is a reference cell. In some embodiments, the second field for the second value is a total downlink assignment indicator (T-DAI) field for the cell. In some embodiments, the field includes a counter downlink assignment indicator (C-DAI) field. In some embodiments, the control information includes a downlink control information (DCI).

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 8 shows an exemplary flowchart for transmitting HARQ-ACK information bits.

FIG. 9 shows an exemplary flowchart for receiving HARQ-ACK information bits.

DETAILED DESCRIPTION

Figure 1:
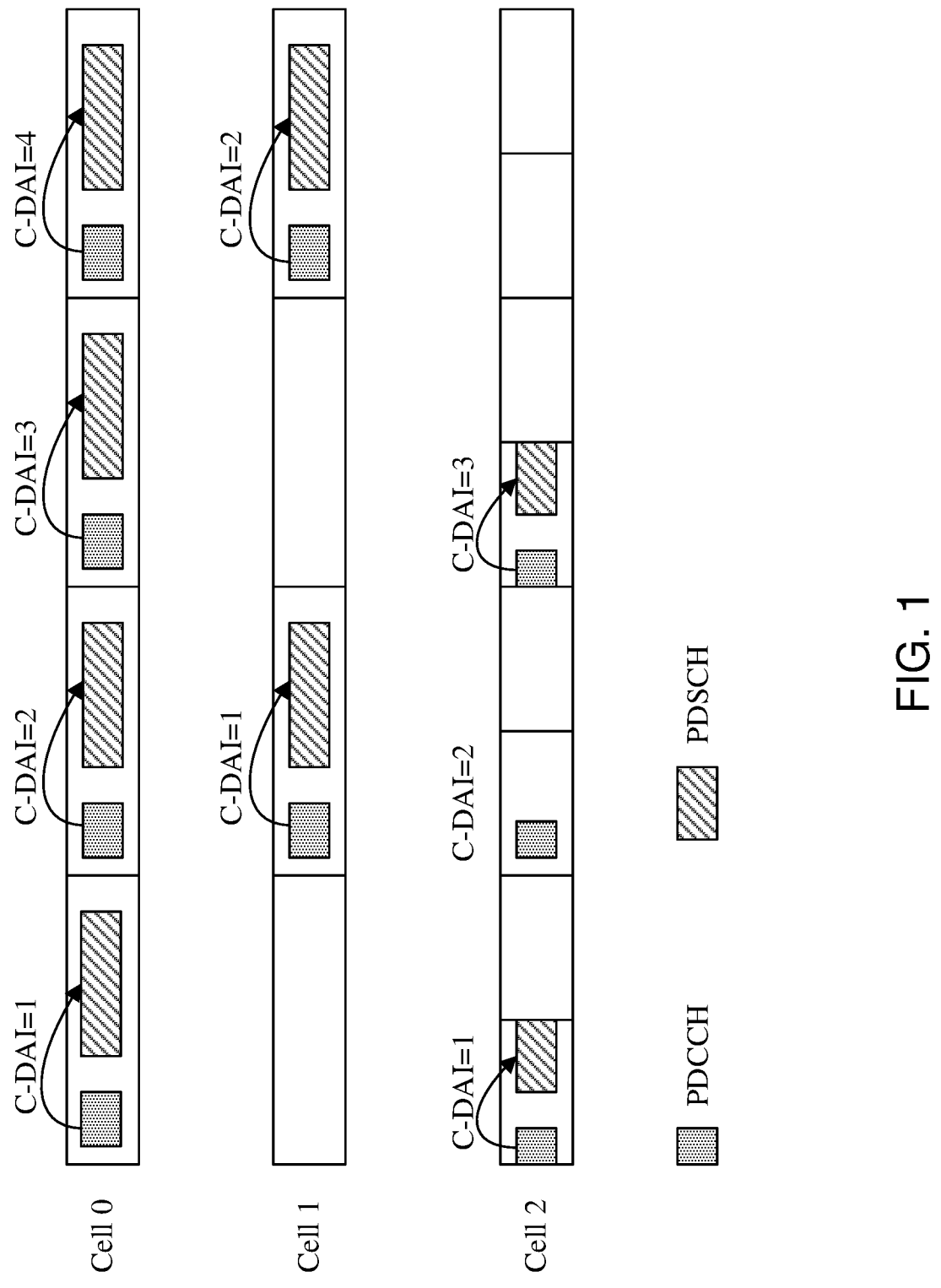
FIG. 1 is an example usage of counter downlink assignment indicator (C-DAI) for self-carrier scheduling.

In the existing 5G specification, two different methods of hybrid automatic repeat request acknowledgement (HARQ-ACK) codebook determination are commonly used. The first method is to determine the HARQ-ACK codebook based on the semi-static configurations, e.g., time division duplex (TDD) configuration and time domain resource allocation (TDRA) configuration. The second method is to determine the HARQ-ACK codebook based on the downlink assignment index (DAI) values across different cells. The first method can have a high overhead in scenarios such as when the UE is configured with multiple cells. The second method can require tight (or stringent) and frequent coordination among different cells since the DAI values can be set across different cells. To address at least these technical problems with existing technology, this patent document describes HARQ-ACK codebook determination techniques that can lower overhead and that may not require frequent and stringent coordination among different cells in some embodiments.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Embodiment #1: General Description

A UE can receive a value of the counter downlink assignment indicator (C-DAI) field in DCI denotes the accumulative number of PDCCH monitoring occasions up to the current PDCCH monitoring occasion for one cell. In some embodiments, the time slots associated with the PDCCH monitoring occasions can include PDSCH receptions associated with the DCI. In some embodiments, the time slots associated with the PDCCH monitoring occasions can be different from the time slots that include PDSCH receptions associated with the DCI. The HARQ-ACK information bits are transmitted by the UE to indicate whether the UE received PDSCH at the time slots associated with the PDCCH monitoring occasions or to indicate whether the UE has received DCI carried by the PDCCH (e.g., in situations where PDCCH may not schedule PDSCH). In this patent document, the term "accumulative number" can refer to a current value of a counter.

In some embodiments, the PDSCH receptions associated with the DCI can refer to the PDSCH receptions scheduled by the DCI received by the UE.

In some embodiments, HARQ-ACK information bits associated with the DCI can refer to HARQ-ACK information bits that are not in response for PDSCH receptions, e.g., DCI indicating SPS PDSCH release, DCI indicating SCell dormancy, and etc.

In case of self-carrier scheduling, the base station transmits the DCI in the cell and UE monitors the DCI in the same cell. The PDSCH receptions or HARQ-ACK information bits are also for this cell.

In case of cross-carrier scheduling, the PDCCH and the corresponding scheduled PDSCH are on different cells. Thus, for self-carrier and cross-carrier scheduling, there can be at least two alternatives.

Alt.1: A value of the C-DAI field in DCI denotes the accumulative number of PDCCH monitoring occasions up to the current PDCCH monitoring occasion for the scheduling cell for one scheduled cell. In some embodiments, the time slots associated with the PDCCH monitoring occasions can include PDSCH receptions associated with the DCI. In some embodiments, the time slots associated with the PDCCH monitoring occasions can be different from the time slots that include PDSCH receptions associated with the DCI. The HARQ-ACK information bits are transmitted by the UE to indicate whether the UE received PDSCH at the time slots associated with the PDCCH monitoring occasions or to indicate whether the UE has received DCI carried by the PDCCH (e.g., in situations where PDCCH may not schedule PDSCH).

Alt.2: A value of the C-DAI field in DCI denotes the accumulative number of PDCCH monitoring occasions up to the current PDCCH monitoring occasion for the scheduling cell for a group of scheduled cells. In some embodiments, the time slots associated with the PDCCH monitoring occasions can include PDSCH receptions associated with the DCI. In some embodiments, the time slots associated with the PDCCH monitoring occasions can be different from the time slots that include PDSCH receptions associated with the DCI. The HARQ-ACK information bits are transmitted by the UE to indicate whether the UE received PDSCH at the time slots associated with the PDCCH monitoring occasions or to indicate whether the UE has received DCI carried by the PDCCH (e.g., in situations where PDCCH may not schedule PDSCH).

The value of the C-DAI field in DCI are ordered based on one of the following alternatives.

Alt.1: PDCCH monitoring occasion index.

For example, the value of the C-DAI field in DCI are ordered in ascending order of PDCCH monitoring occasion index.

Alt.2: PDSCH reception starting time and PDCCH monitoring occasion index.

For example, the value of the C-DAI field in DCI are ordered first in increasing order of the PDSCH reception starting time for PDSCH receptions that are scheduled from a same PDCCH monitoring occasion; second in ascending order of PDCCH monitoring occasion index.

Alt.3: PDSCH reception starting time, serving cell index and PDCCH monitoring occasion index.

For example, the value of the C-DAI field in DCI are ordered first in increasing order of the PDSCH reception starting time for PDSCH receptions in a same serving cell that are scheduled from a same PDCCH monitoring occasion; second in ascending order of serving cell index, and third in ascending order of PDCCH monitoring occasion index.

FIG. 1 is an example of C-DAI in case of self-carrier scheduling. For self-carrier scheduling, PDCCH and PDSCH are transmitted on the same cell. The C-DAI value is counted separately for each cell. The PDCCH corresponding to C-DAI=2 on Cell 2 can refer to PDCCH carrying DCI indicating SPS PDSCH release.

Figure 2:
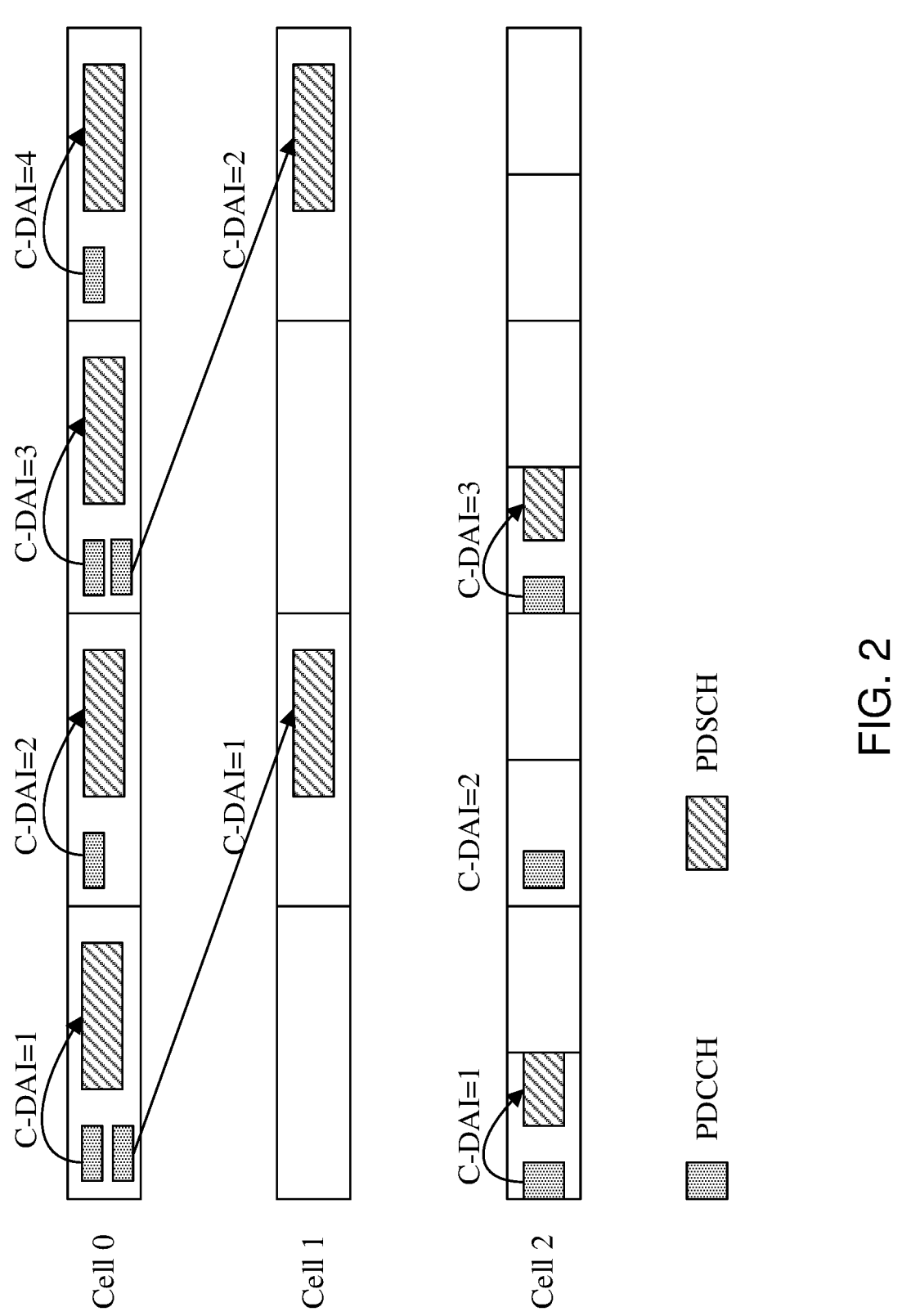
FIGS. 2-3 show example usages of C-DAI for cross-carrier scheduling.

FIG. 2 is an example of C-DAI in case of cross-carrier scheduling (e.g., as described in the first Alt.1 in Section I of this patent document). For cross-carrier scheduling, PDCCH and PDSCH can be transmitted on different cells. In FIG. 2, Cell 0 schedules PDSCH for itself and schedules PDSCH for Cell 1. Cell 2 is self-scheduling. In this case, the C-DAI value is counted separately for each scheduled cell.

Figure 3:
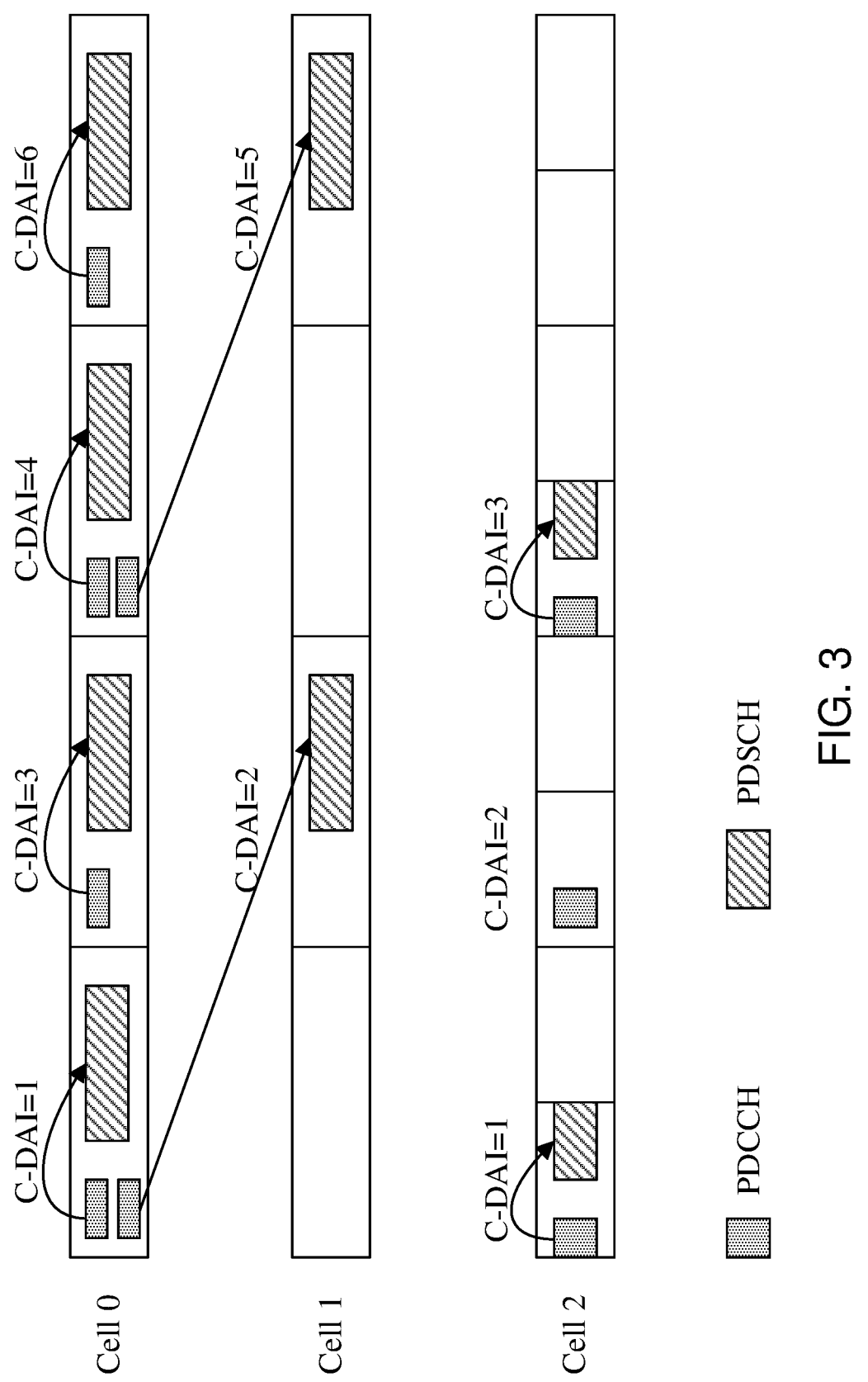

FIG. 3 is another example of C-DAI in case of cross-carrier scheduling (e.g., as described in the first Alt.2 in Section I of this patent document). In FIG. 3, Cell 0 schedules PDSCH for itself and schedules PDSCH for Cell 1. Cell 2 is self-scheduling. In this case, since both PDCCH for Cell 0 and PDCCH for Cell 1 are transmitted on Cell 0, the C-DAI is counted per scheduling cell for all the scheduled cells (i.e., Cell 0 and Cell 1).

In some embodiments, Table 1 (shown below) shows an example of the relationships between the PDCCH monitoring occasions (indicated by the PDCCH monitoring index), the received PDCCH, the C-DAI value and the DCI field.

TABLE 1

| PDCCH Monitoring occasion index | 1 | 2 | 3 | 4 | 5 | 6 | 7 | 8 | 9 |
|---|---|---|---|---|---|---|---|---|---|
| Received PDCCH? | Yes | No | Yes | Yes | No | Yes | Yes | Yes | Yes |
| C-DAI value | 1 | | 2 | 3 | | 4 | 5 | 6 | 7 |
| DCI field (e.g., 2 bit) | 00 | | 01 | 10 | | 11 | 00 | 01 | 10 |

II. Embodiment #2: Method 1: T-DAI

UE generates HARQ-ACK feedback based on the C-DAI value. Take FIG. 1 as an example, UE generates HARQ-ACK feedback for the 4 PDSCHs in Cell 0. If PDCCH corresponding to C-DAI=2 is missed by the UE, UE can figure out or determine this since the C-DAI values in the received PDCCHs are not contiguous. However, if PDCCH corresponding to C-DAI=4 is missed by the UE in this example, UE cannot figure out or cannot determine this since the C-DAI values in the received PDCCHs are still contiguous. To overcome this, a total DAI (T-DAI) value can be introduced. In some embodiments, C-DAI can be in a DCI format scheduling DL PDSCH, whereas T-DAI can be in DCI format scheduling UL PUSCH. In some embodiments, both C-DAI and T-DAI can be in DCI format scheduling DL PDSCH.

The T-DAI can be defined as one of the following.

Alt.1: the value of the T-DAI in a DCI denotes the total number of PDCCH monitoring occasions up to the current PDCCH monitoring occasion for each scheduling cell, where the time slots associated with the PDCCH monitoring occasions can include PDSCH receptions associated with the DCI, and where HARQ-ACK information bits are transmitted by the UE to indicate whether the UE received PDSCH at the time slots associated with the PDCCH monitoring occasions or to indicate whether the UE has received DCI carried by the PDCCH (e.g., in situations where PDCCH may not schedule PDSCH). For example, if UE is configured with three cells, then three T-DAI fields are included in the DCI. Each T-DAI field indicates one value of T-DAI for each cell.

Alt.2: the value of the T-DAI in a DCI denotes the total number of PDCCH monitoring occasions up to the current PDCCH monitoring occasion for each scheduled cell. In some embodiments, the time slots associated with the PDCCH monitoring occasions can include PDSCH receptions associated with the DCI. In some embodiments, the time slots associated with the PDCCH monitoring occasions can be different from the time slots that include PDSCH receptions associated with the DCI. The HARQ-ACK information bits are transmitted by the UE to indicate whether the UE received PDSCH at the time slots associated with the PDCCH monitoring occasions or to indicate whether the UE has received DCI carried by the PDCCH (e.g., in situations where PDCCH may not schedule PDSCH).

Alt.3: the value of the T-DAI in a DCI denotes the total number of PDCCH monitoring occasions up to the current PDCCH monitoring occasion for a group of cell(s). In some embodiments, the time slots associated with the PDCCH monitoring occasions can include PDSCH receptions associated with the DCI. In some embodiments, the time slots associated with the PDCCH monitoring occasions can be different from the time slots that include PDSCH receptions associated with the DCI. The HARQ-ACK information bits are transmitted by the UE to indicate whether the UE received PDSCH at the time slots associated with the PDCCH monitoring occasions or to indicate whether the UE has received DCI carried by the PDCCH (e.g., in situations where PDCCH may not schedule PDSCH). Base station can configure one or more than one cell in the group. Take FIG. 3 as an example, if Cell 0 and Cell 1 are configured as one group and Cell 2 is configured as another group, then two T-DAI fields are included in the DCI. Each T-DAI field indicates one value of T-DAI for each group.

The T-DAI can also be defined as one of the following.

Alt.4: the value of the T-DAI denotes the total number of PDCCH monitoring occasions for one cell and the HARQ-ACK feedback for these PDCCH monitoring occasions is to be multiplexed in the PUSCH scheduled by the DCI carrying the T-DAI. In some embodiments, the time slots associated with the PDCCH monitoring occasions can include PDSCH receptions associated with the DCI. In some embodiments, the time slots associated with the PDCCH monitoring occasions can be different from the time slots that include PDSCH receptions associated with the DCI. The HARQ-ACK information bits are transmitted by the UE to indicate whether the UE received PDSCH at the time slots associated with the PDCCH monitoring occasions or to indicate whether the UE has received DCI carried by the PDCCH (e.g., in situations where PDCCH may not schedule PDSCH).

Take FIG. 1 as an example, if all the HARQ-ACK feedback for the 4 PDCCH monitoring occasions in Cell 0, 2 PDCCH monitoring occasions in Cell 1 and 3 PDCCH monitoring occasions in Cell 2 are to be multiplexed in one PUSCH scheduled by a DCI, the DCI indicates three T-DAI value, i.e., one for Cell 0, one for Cell 1 and one for Cell 2. The T-DAI value for Cell 0, Cell 1 and Cell 2 indicates 4, 2 and 3, respectively.

Alt.5: the value of the T-DAI denotes the total number of PDCCH monitoring occasions for a group of cell(s) and the HARQ-ACK feedback for these PDCCH monitoring occasions is to be multiplexed in the PUSCH scheduled by the DCI carrying the T-DAI. In some embodiments, the time slots associated with the PDCCH monitoring occasions can include PDSCH receptions associated with the DCI. In some embodiments, the time slots associated with the PDCCH monitoring occasions can be different from the time slots that include PDSCH receptions associated with the DCI. The HARQ-ACK information bits are transmitted by the UE to indicate whether the UE received PDSCH at the time slots associated with the PDCCH monitoring occasions or to indicate whether the UE has received DCI carried by the PDCCH (e.g., in situations where PDCCH may not schedule PDSCH). Base station can configure one or more than one cell in the group. Typically, if cross-carrier scheduling is configured, all the cells scheduled by the same scheduling cell are in one group.

Take FIG. 3 as an example, if all the HARQ-ACK feedback for the 4 PDCCH monitoring occasions in Cell 0, 2 PDCCH monitoring occasions in Cell 1 and 3 PDCCH monitoring occasions in Cell 2 are to be multiplexed in one PUSCH scheduled by a DCI, the DCI indicates two T-DAI value, i.e., one for the first group and one for the second group. The first group contains Cell 0 and Cell 1; the second group contains Cell 2. The T-DAI for the first group is 6 and the T-DAI for the second group is 2.

III. Embodiment #3: Method 2: T-DAI for Reference Cell

The value of the T-DAI denotes the total number of PDCCH monitoring occasions for one cell and the HARQ-ACK feedback for these PDCCH monitoring occasions is to be multiplexed in the PUSCH scheduled by the DCI carrying the T-DAI. In some embodiments, the time slots associated with the PDCCH monitoring occasions can include PDSCH receptions associated with the DCI. In some embodiments, the time slots associated with the PDCCH monitoring occasions can be different from the time slots that include PDSCH receptions associated with the DCI. The HARQ-ACK information bits are transmitted by the UE to indicate whether the UE received PDSCH at the time slots associated with the PDCCH monitoring occasions or to indicate whether the UE has received DCI carried by the PDCCH (e.g., in situations where PDCCH may not schedule PDSCH).

In some embodiments, the DCI can indicate to the UE the T-DAI for the reference cell and UE can determine one or more T-DAI values for one or more other cells based on the T-DAI for the reference cell. If the value of T-DAI for the reference cell is Y, the value of the T-DAI for other cell (denoted as X) can be determined (e.g., by the UE) by any one of the following alternatives. The HARQ-ACK feedback for the X PDCCH monitoring occasions for the other cell can also be multiplexed in the PUSCH. Y is integer number larger than 0.

The reference cell can be PCell, PSCell, PUCCH-SCell, the scheduling cell or configured by the base station. For example, the DCI indicates T-DAI value for the PCell, and then UE determines T-DAI value for the SCell based on the T-DAI value for the PCell.

In some embodiments, X is equal to the largest C-DAI value (denoted as X1) received by the UE for the cell. However, if X is larger than X1, UE reports NACK value(s) for HARQ-ACK information bit(s) corresponding to the last X-X1 C-DAI values in a HARQ-ACK codebook.

Alt.1: X=p*Y, p is the scaling factor and p is integer number larger than 0.

The scaling factor can be determined by the sub-carrier spacing, numerology corresponding to the sub-carrier spacing, number of PDCCH monitoring occasion or PDCCH monitoring capability. The scaling factor can also be configured by the base station.

If the numerology corresponding to the sub-carrier spacing of reference cell is u0 and the numerology corresponding to the sub-carrier spacing of the other cell is u1, then $p=2^{u1-u0}$.

Figure 4:
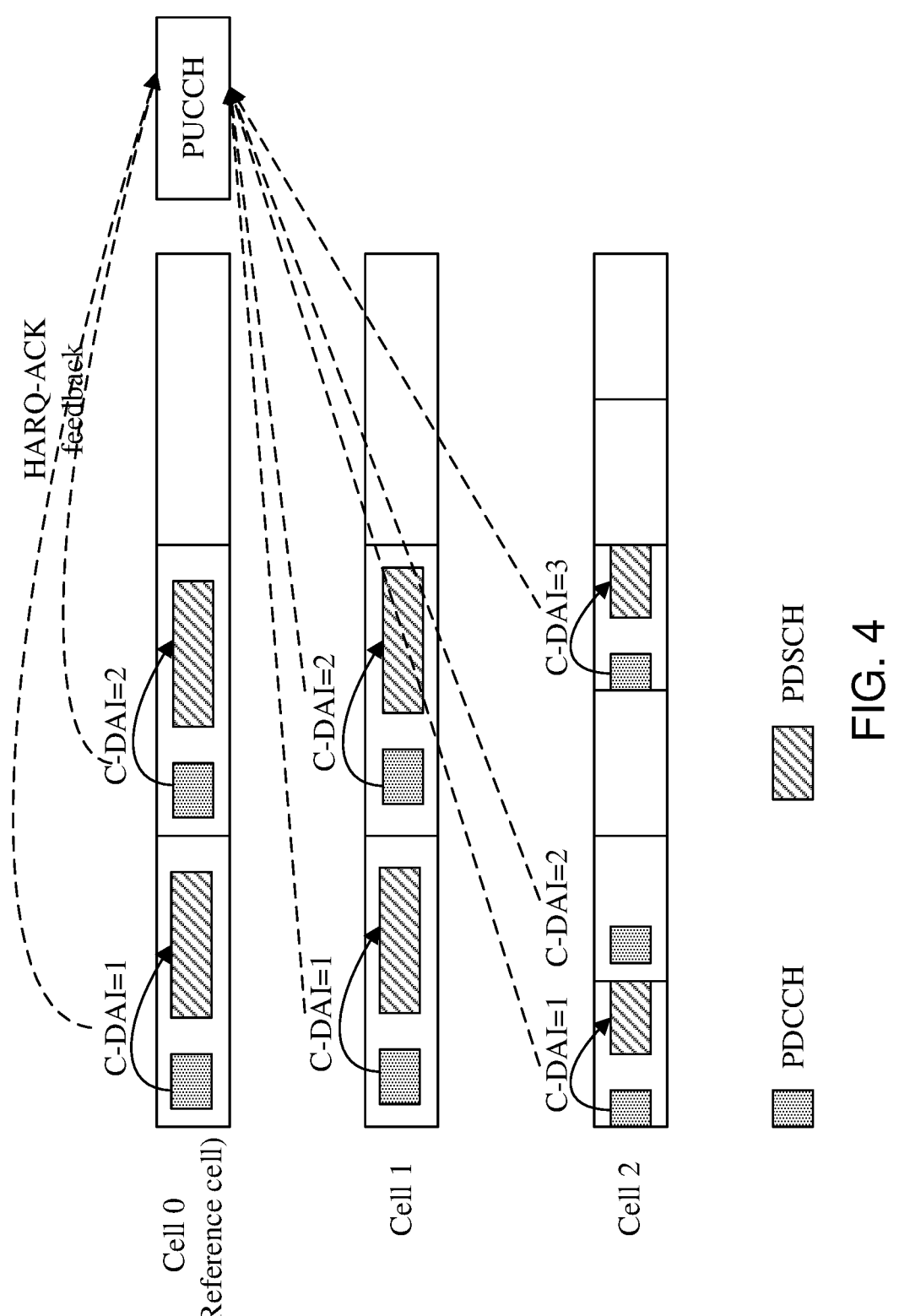
FIGS. 4-5 show example usages of total downlink assignment indicator (T-DAI) for a reference cell.

Take FIG. 4 as an example, Cell 0 is the reference cell and T-DAI for reference cell is 2, i.e., Y=2. The scaling factor for Cell 1 is 1 and scaling factor for Cell 2 is 2. Then the T-DAI for Cell 1 and Cell 2 is 2 and 4, respectively. Since UE only receives 3 DCI in Cell 2, UE reports NACK value(s) for the feedback corresponding to C-DAI=4. The HARQ-ACK feedbacks corresponding to all the C-DAI values in these cells are multiplexed in the same PUCCH in this example.

Alt.2: $X=\lfloor p*Y \rfloor$, p is the scaling factor. p is integer number or decimal number, and p is larger than 0.

The scaling factor can be determined by the sub-carrier spacing, numerology corresponding to the sub-carrier spacing, number of PDCCH monitoring occasion or PDCCH monitoring capability. The scaling factor can also be configured by the base station.

If the numerology corresponding to the sub-carrier spacing of reference cell is u0 and the numerology corresponding to the sub-carrier spacing of the other cell is u1, then $p=2^{u1-u0}$.

Alt.3: X=Y+q, q is integer number and q is determined by the sub-carrier spacing, numerology corresponding to the sub-carrier spacing, number of PDCCH monitoring occasion configured by the base station or PDCCH monitoring capability. Besides, q can also be configured by base station.

IV. Embodiment #4: Method 3: T-DAI for Reference Cell

If the value of T-DAI for the reference cell is Y, the value of the T-DAI for other cell (denoted as X) can be determined as following, i.e., (X−1) mod T+1=(Y−1) mod T+1. T is integer number. Typically, denote by N the number of bits for the C-DAI and set $T=2^N$.

X and Y are integer number larger than 0. N is integer number larger than 0, and typically N=2.

X is not smaller than the total number of PDCCH monitoring occasions for the cell where UE received PDCCH and the HARQ-ACK feedback for these PDCCH monitoring occasions is to be multiplexed in the PUSCH scheduled by the DCI carrying the T-DAI. In some embodiments, the time slots associated with the PDCCH monitoring occasions can include PDSCH receptions associated with the DCI. In some embodiments, the time slots associated with the PDCCH monitoring occasions can be different from the time slots that include PDSCH receptions associated with the DCI. The HARQ-ACK information bits are transmitted by the UE to indicate whether the UE received PDSCH at the time slots associated with the PDCCH monitoring occasions or to indicate whether the UE has received DCI carried by the PDCCH (e.g., in situations where PDCCH may not schedule PDSCH).

Take FIG. 4 as an example, set N=2 and thus T=4. Base station can indicate Y=2 for the reference cell (i.e., Cell 0). (Y−1) mod T+1=(2−1) mod 4+1=2. Then we can derive that (X−1) mod 4+1=2. Since X needs to be equal to or larger than the total number of PDCCH monitoring occasions for Cell 2, then X can be 6. In some embodiments, the time slots associated with the PDCCH monitoring occasions can include PDSCH receptions associated with the DCI. In some embodiments, the time slots associated with the PDCCH monitoring occasions can be different from the time slots that include PDSCH receptions associated with the DCI. The HARQ-ACK information bits are transmitted by the UE to indicate whether the UE received PDSCH at the time slots associated with the PDCCH monitoring occasions or to indicate whether the UE has received DCI carried by the PDCCH (e.g., in situations where PDCCH may not schedule PDSCH). Since UE only receives PDCCH corresponding to 3 C-DAI values for Cell 2, UE reports NACK value(s) for HARQ-ACK information bit(s) corresponding to the last 3 C-DAI values in a HARQ-ACK codebook.

X is not smaller than the total number of PDCCH monitoring occasions for a group of cell(s) and the HARQ-ACK feedback for these PDCCH monitoring occasions is to be multiplexed in the PUSCH scheduled by the DCI carrying the T-DAI. In some embodiments, the time slots associated with the PDCCH monitoring occasions can include PDSCH receptions associated with the DCI. In some embodiments, the time slots associated with the PDCCH monitoring occasions can be different from the time slots that include PDSCH receptions associated with the DCI. The HARQ-ACK information bits are transmitted by the UE to indicate whether the UE received PDSCH at the time slots associated with the PDCCH monitoring occasions or to indicate whether the UE has received DCI carried by the PDCCH (e.g., in situations where PDCCH may not schedule PDSCH).

Figure 5:
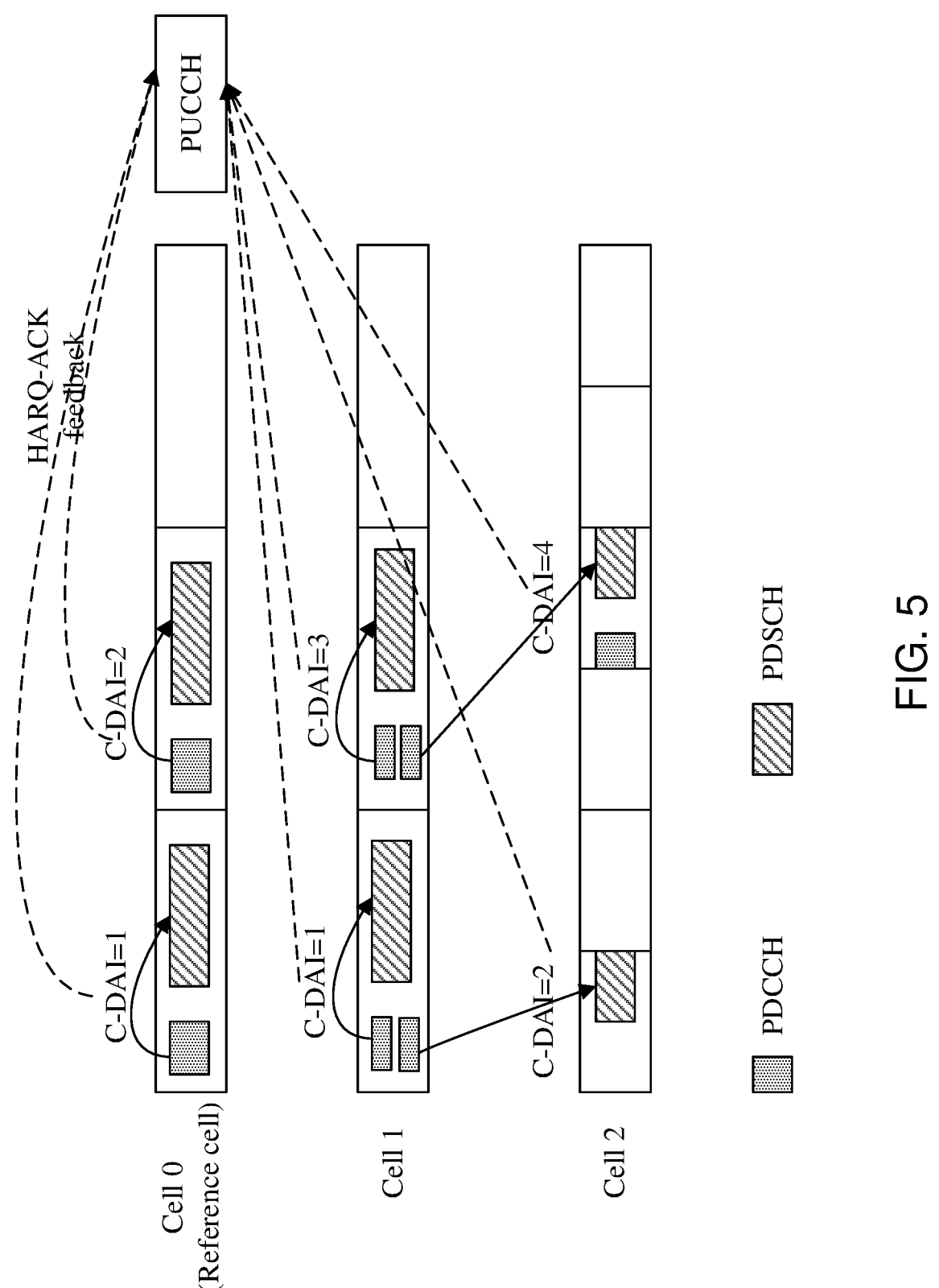

Take FIG. 5 as an example, Cell 0 is self-carrier scheduling and Cell 1 cross-carrier schedules Cell 2. Cell 1 and Cell 2 are configured as a group for C-DAI counting. Set N=2 and thus T=4. Base station can indicate Y=2 for the reference cell (i.e., Cell 0). (Y−1) mod T+1=(2−1) mod 4+1=2. Then we can derive that (X−1) mod 4+1=2. Since X needs to be equal to or larger than the total number of PDCCH monitoring occasions in which PDSCH receptions or HARQ-ACK information bits, associated with DCI for Cell 1 and Cell 2, is present for Cell 2, then X can be 6. Since UE only receives PDCCH corresponding to 4 C-DAI values for Cell 1 and Cell 2, UE reports NACK value(s) for HARQ-ACK information bit(s) corresponding to the last 2 C-DAI values in a HARQ-ACK codebook.

V. Embodiment #5: Fallback Operation

To further reduce the feedback overhead, some fallback operation can be defined.

If the value of T-DAI for the reference cell is larger than 0 and UE doesn't receive any PDCCH on another cell, UE doesn't generate any feedback for this another cell. In this case, UE doesn't need to generate the dummy feedback for this another cell, thus the feedback overhead can be reduced.

If the value of T-DAI for the reference cell is larger than M and UE doesn't receive any PDCCH on another cell, UE generates one bit of NACK info for this another cell. M is integer number larger than 0. Typically, M can have the same value of T, i.e., $M=T=2^N$. If N is set as 2, then M is 4.

If UE doesn't receive any PDCCH on the reference cell, UE generates feedback for other cell based on the C-DAI value for the other cell and UE doesn't generate feedback for the reference cell.

If the value of T-DAI for the reference cell is 0, UE generates feedback for other cell based on the C-DAI value of the other cell and UE doesn't generate feedback for the reference cell.

VI. Embodiment #6: PRI Indication

PUCCH Resource Indicator (PRI) is used to indicate the PUCCH resource to carry the HARQ-ACK feedback for the received PDCCHs in the corresponding PDCCH monitoring occasions. Different DCI may carry different PRI values.

The PUCCH resource determination is based on a PRI field in a reference DCI, among the DCI indicating a same slot for the PUCCH transmission, that the UE detects and for which the UE transmits corresponding HARQ-ACK information in the PUCCH.

The reference DCI is determined by one of the following alternatives.

Alt.1: The reference DCI is the last DCI among the DCI indicating a same slot for the PUCCH transmission in the reference cell.

Take FIG. 4 as an example, DCI in Cell 0 that corresponds to C-DAI=2 is the reference DCI. The PRI carried by this reference DCI will be used to determine the PUCCH resource.

Alt.2: The reference DCI is the last DCI among the DCI indicating a same slot for the PUCCH transmission in the cell with the smallest serving cell index.

Alt.3: The reference DCI is the last DCI among the DCI indicating a same slot for the PUCCH transmission in the cell with the largest serving cell index.

Alt.4: For the last DCI among the DCI indicating a same slot for the PUCCH transmission in each cell, the reference DCI is last DCI in each cell with the smallest PRI value.

Alt.5: For the last DCI among the DCI indicating a same slot for the PUCCH transmission in each cell, the reference DCI is last DCI in each cell with the largest PRI value.

Alt.6: The reference DCI is the last DCI among the DCI indicating a same slot for the PUCCH transmission among all the cells.

The DCI may include DCI scheduling PDSCH, DCI indicating SPS release, DCI indicating SCell dormancy and etc. The DCI may exclude the SPS activation DCI. The slot for the PUCCH transmission may be indicated by the PDSCH-to-HARQ_feedback timing indicator field or a value configured by RRC signaling, e.g., dl-DataToUL-ACK, or dl-DataToUL-ACK-r16, or dl-DataToUL-ACK-DCI-1-2, or dl-DataToUL-ACK-r17, or dl-DataToUL-ACK-MulticastDciFormat4_1.

VII. Embodiment #7: Last DCI Indication

One field in the DCI is used to indicate whether the DCI is the last DCI for one cell indicating a same slot for the PUCCH transmission, among the DCIs that the UE detects and for which the UE transmits corresponding HARQ-ACK information in the PUCCH. For example, 1 bit is included in the DCI, '1' indicates it as last DCI while '0' indicates it is not the last DCI.

The following alternatives can be considered.

Alt.1: If UE doesn't receive DCI indicated as last DCI for one cell, UE doesn't generate feedback for this cell.

Alt.2: If UE doesn't receive DCI indicated as last DCI for one cell, UE generates feedback for this cell and adds one bit of NACK at the end of feedback for this cell.

VIII. Embodiment #8: Indication in the PUCCH

In the PUCCH carrying HARQ-ACK feedback, 1 bit is included in the PUCCH to indicate whether there is HARQ-ACK feedback for one cell or a group of cell(s).

Take FIG. 5 as an example. 1 bit is for Cell 0 and another 1 bit is for Cell 1 and Cell 2 since Cell 2 and Cell 2 are configured as a group of cells.

Figure 6:
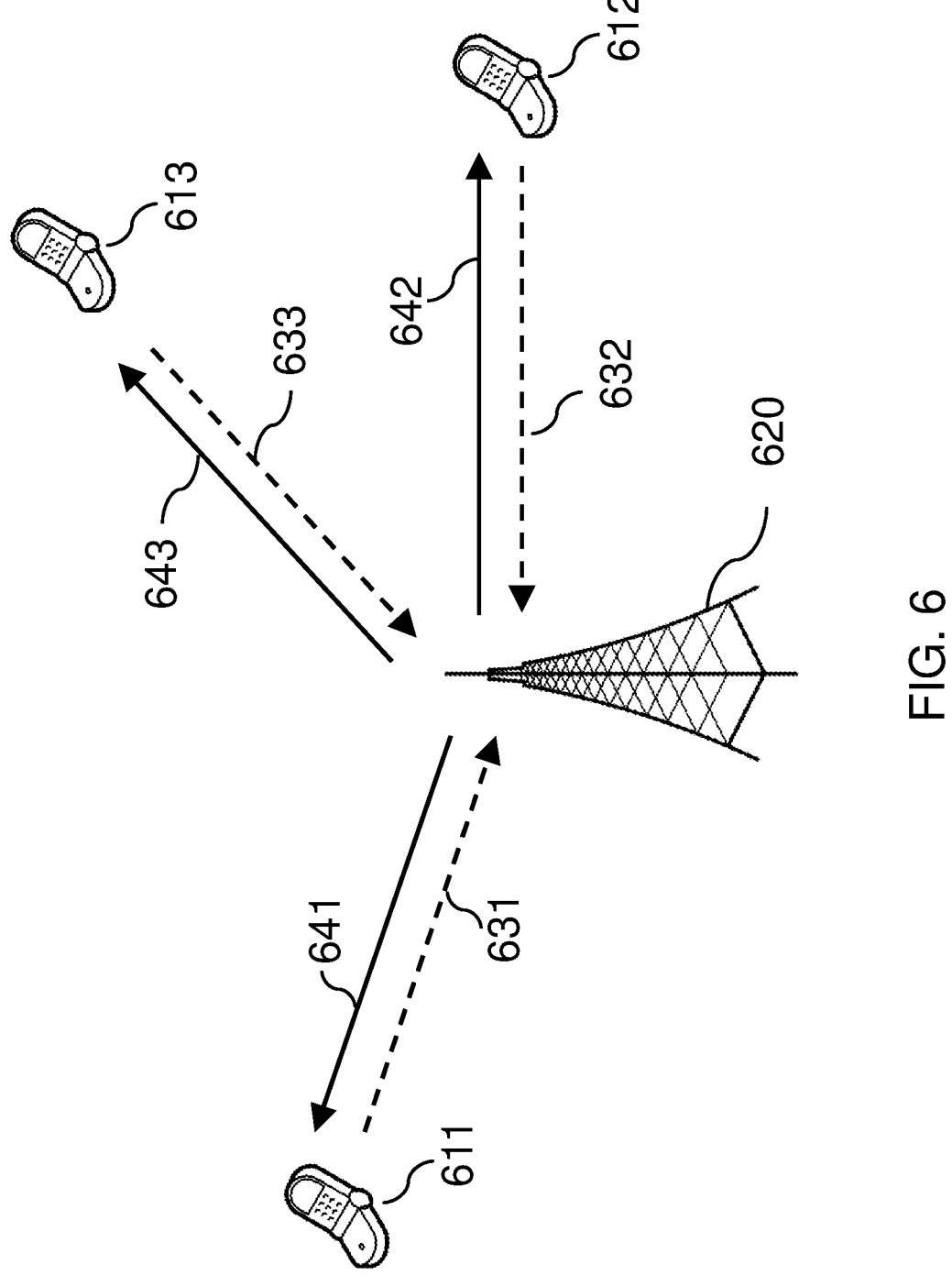
FIG. 6 shows an example of wireless communication including a base station (BS) and user equipment (UE) based on some implementations of the disclosed technology.

The implementations as discussed above will apply to a wireless communication. FIG. 6 shows an example of a wireless communication system (e.g., a 5G or NR cellular network) that includes a base station 620 and one or more user equipment (UE) 611, 612 and 613. In some embodiments, the UEs access the BS (e.g., the network) using a communication link to the network (sometimes called uplink direction, as depicted by dashed arrows 631, 632, 633), which then enables subsequent communication (e.g., shown in the direction from the network to the UEs, sometimes called downlink direction, shown by arrows 641, 642, 643) from the BS to the UEs. In some embodiments, the BS send information to the UEs (sometimes called downlink direction, as depicted by arrows 641, 642, 643), which then enables subsequent communication (e.g., shown in the direction from the UEs to the BS, sometimes called uplink direction, shown by dashed arrows 631, 632, 633) from the UEs to the BS. The UE may be, for example, a smartphone, a tablet, a mobile computer, a machine to machine (M2M) device, an Internet of Things (IoT) device, and so on.

Figure 7:
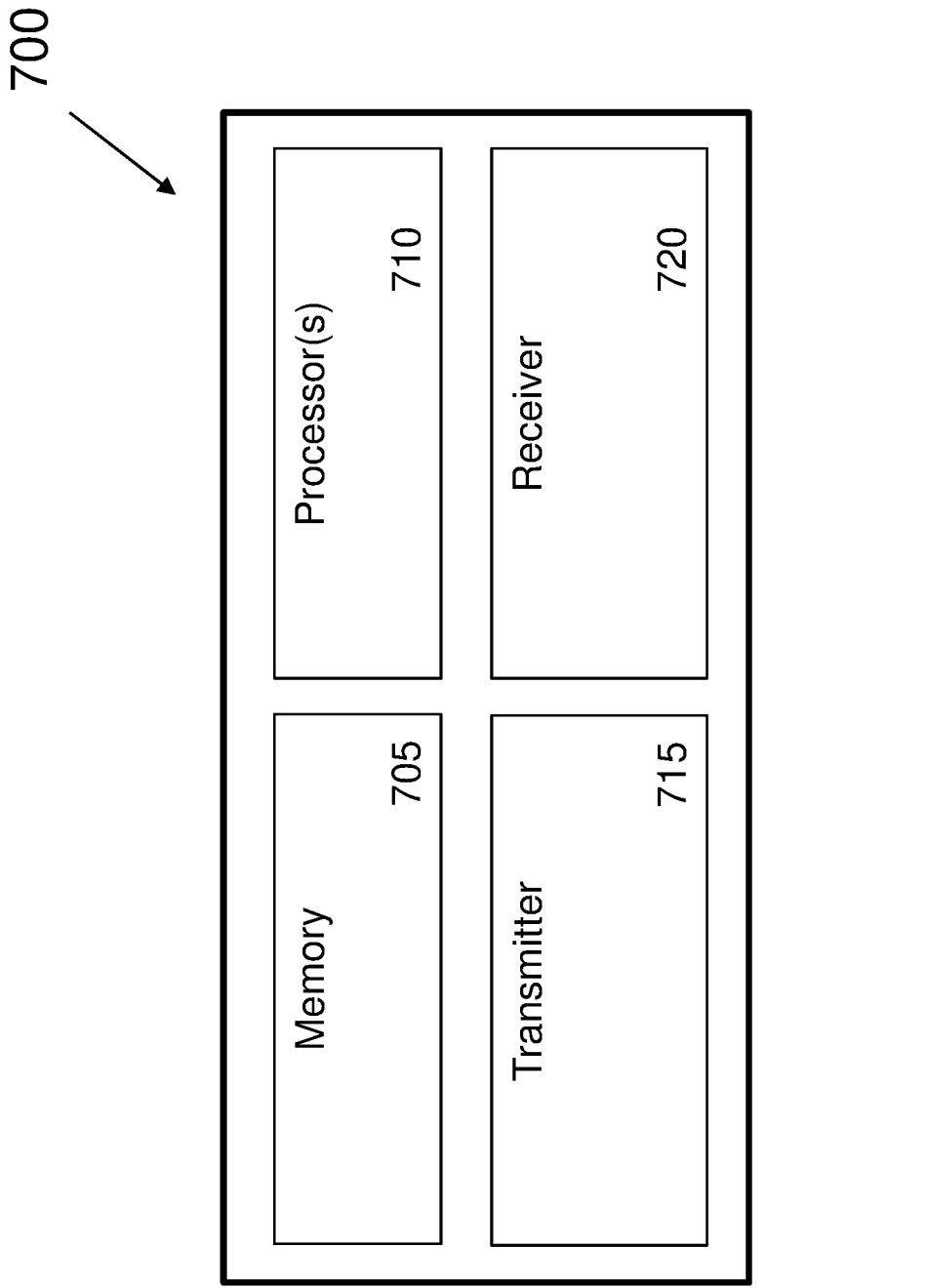
FIG. 7 shows an exemplary block diagram of a hardware platform that may be a part of a network device or a communication device.

FIG. 7 shows an exemplary block diagram of a hardware platform 700 that may be a part of a network device (e.g., base station) or a communication device (e.g., a user equipment (UE)). The hardware platform 700 includes at least one processor 710 and a memory 705 having instructions stored thereupon. The instructions upon execution by the processor 710 configure the hardware platform 700 to perform the operations described in FIGS. 1 to 6, 8 to 9, and in the various embodiments described in this patent document. The transmitter 715 transmits or sends information or data to another device. For example, a network device transmitter can send a message to a user equipment. The receiver 720 receives information or data transmitted or sent by another device. For example, a user equipment can receive a message from a network device.

FIG. 8 shows an exemplary flowchart for transmitting HARQ-ACK information bits. Operation 802 includes receiving, by a communication device from a cell, control information that includes a field comprising a value, where the value indicates a current number of a control channel monitoring occasion that is associated with the cell and is to be monitored by the communication device, and where the current number of the control channel monitoring occasion is part of a series of numbers associated with a set of control channel monitoring occasions where control channels are received or are to be received from the cell. Operation 804 includes transmitting one or more hybrid automatic repeat request acknowledgement (HARQ-ACK) information bits indicating whether a shared channel associated with the control channel monitoring occasion is received by the communication device or indicating that the communication device received the control information.

In some embodiments, the value in the field indicates the current number of a control channel monitoring occasion that is associated with the cell, and the cell is a scheduling cell for one scheduled cell in a group of scheduled cells. In some embodiments, the value in the field indicates the current number of a control channel monitoring occasion that is associated with the cell and one or more other cells, and the cell is a scheduling cell for a group of scheduled cells that includes the cell and the one or more other cells. In some embodiments, the field is based on or indicates: a control channel monitoring occasion index of the control channel monitoring occasion, or a shared channel reception start time of the shared channel and the control channel monitoring occasion index of the control channel monitoring occasion, or the shared channel reception start time, an index of a serving cell, and the control channel monitoring occasion index of the control channel monitoring occasion. In some embodiments, the method further comprises receiving a second control information that includes a second field that includes a second value that indicates a total number of control channel monitoring occasions in the set of control channel monitoring occasions associated with the cell, where the transmitting the one or more HARQ-ACK information bits comprises: obtaining a multiplexed HARQ-ACK information bits by multiplexing a plurality of HARQ-ACK information bits that indicate whether a set of shared channels are received by the communication device and/or that the communication device received the control information, wherein the plurality of HARQ-ACK information bits comprise the one or more HARQ-ACK information bits; and transmitting the multiplexed HARQ-ACK information bits in an uplink shared channel scheduled by the control channel that includes the second field.

In some embodiments, the second value of the second field indicates the total number of control channel monitoring occasions in the set of control channel monitoring occasions associated with the cell that is a reference cell, the communication device determines one or more second values associated with one or more other cells based on the second value of the second field, and each of the one or more second values indicates a total number of control channel monitoring occasions in one set of control channel monitoring occasions associated with one of the one or more other cells. In some embodiments, the second field for the second value is a total downlink assignment indicator (T-DAI) field for the cell, the communication device determines a third value of a second T-DAI field based on the second value of the T-DAI field, the third value of the second T-DAI field indicates a second total number of control channel monitoring occasion in a second set of control channel monitoring occasions that are associated with a second cell and that are to be monitored by the communication device, and the second value is referred as Y and the third value is referred as X. In some embodiments, the X is equal to a largest value (X1) from the series of numbers associated with the set of control channel monitoring occasions where control channels are received or are to be received from the cell.

In some embodiments, X1 is a largest value from the series of numbers associated with the set of control channel monitoring occasions where control channels are received or are to be received from the cell, and in response to X being larger than X1, the communication device transmits a non-acknowledgement (NACK) value for HARQ-ACK information bits corresponding to a last X-X1 counter downlink assignment indicator (C-DAI) values in a HARQ-ACK codebook for at least some of the second set of control channel monitoring occasions. In some embodiments, $X=p*Y$, p is a scaling factor, and p is an integer larger than 0. In some embodiments, $X=\lfloor p*Y \rfloor$, p is a scaling factor, p is an integer or decimal number, and p is larger than 0. In some embodiments, p is determined by a sub-carrier spacing, a numerology corresponding to the sub-carrier spacing, a total number of control channel monitoring occasions, or PDCCH monitoring capability, or p is configured by a base station In some embodiments, $X=Y+q$, q is an integer, and q is determined by a sub-carrier spacing, a numerology corresponding to the sub-carrier spacing, a total number of control channel monitoring occasions or PDCCH monitoring capability, or q is configured by a base station. In some embodiments, $(X-1) \bmod T+1=(Y-1) \bmod T+1$, and T and N are integers. In some embodiments, T is an integer that is equal to $2^N$, and N is a number of bits for the field. In some embodiments, X, Y and N are integers larger than 0. In some embodiments, X is not smaller than the total number of control channel monitoring occasions in the set of control channel monitoring occasions where control channels are received. In some embodiments, the cell is a reference cell, the communication device determines not to generate or determines not to transmit feedback to the second cell in response to: the second value of the T-DAI field being larger than zero, and the communication device determining an absence of reception of one or more control channel from the second cell. In some embodiments, the cell is a reference cell, the communication device generates and transmits one bit of non-acknowledgement (NACK) information to the second cell in response to: the second value of the T-DAI field being larger than M, wherein M is an integer greater than zero, and the communication device determining an absence of reception of one or more control channel from the second cell.

In some embodiments, the cell is a reference cell, in response to determining an absence of reception of one or more control channels from the cell: the communication device determines not to generate or determines not to transmit feedback to the cell, and the communication device generates and transmits feedback to a second cell based on the value that indicates a second current number of a second control channel monitoring occasion that is associated with a second cell. In some embodiments, the cell is a reference cell, the method further comprises: receiving a second control information that includes a second field that includes a second value that indicates a total number of control channel monitoring occasions in the set of control channel monitoring occasions associated with the cell, in response to the second value being equal to zero: the communication device determines not to generate or determines not to transmit feedback to the cell, and the communication device generates and transmits feedback to a second cell based on the value that indicates a second current number of a second control channel monitoring occasion that is associated with a second cell. In some embodiments, the field includes a counter downlink assignment indicator (C-DAI) field. In some embodiments, the control information includes a downlink control information (DCI).

FIG. 9 shows an exemplary flowchart for receiving HARQ-ACK information bits. Operation 902 includes transmitting, by a network device, control information that includes a field comprising a value, where the value indicates a current number of a control channel monitoring occasion that is associated with a cell of the network device and is to be monitored by a communication device, and where the current number of the control channel monitoring occasion is part of a series of numbers associated with a set of control channel monitoring occasions where control channels are transmitted or are to be transmitted from the cell to the communication device. Operation 904 includes receiving one or more hybrid automatic repeat request acknowledgement (HARQ-ACK) information bits indicating whether a shared channel associated with the control channel monitoring occasion is received by the communication device or indicating that the communication device received the control information.

In some embodiments, the value in the field indicates the current number of a control channel monitoring occasion that is associated with the cell, and the cell is a scheduling cell for one scheduled cell in a group of scheduled cells. In some embodiments, the value in the field indicates the current number of a control channel monitoring occasion that is associated with the cell and one or more other cells, and the cell is a scheduling cell for a group of scheduled cells that includes the cell and the one or more other cells. In some embodiments, the field is based on or indicates: a control channel monitoring occasion index of the control channel monitoring occasion, or a shared channel reception start time of the shared channel and the control channel monitoring occasion index of the control channel monitoring occasion, or the shared channel reception start time, an index of a serving cell, and the control channel monitoring occasion index of the control channel monitoring occasion. In some embodiments, the method further comprises transmitting a second control information that includes a second field that includes a second value that indicates a total number of control channel monitoring occasions in the set of control channel monitoring occasions associated with the cell, where the receiving the one or more HARQ-ACK information bits comprises: receiving multiplexed HARQ-ACK information bits in an uplink shared channel scheduled by the control channel that includes the second field, wherein the multiplexed HARQ-ACK information bits comprise a plurality of HARQ-ACK information bits that indicate whether a set of shared channels are received by the communication device and/or that the communication device received the control information, and the one or more HARQ-ACK information bits.

In some embodiments, the second value of the second field indicates the total number of control channel monitoring occasions in the set of control channel monitoring occasions associated with the cell that is a reference cell. In some embodiments, the second field for the second value is a total downlink assignment indicator (T-DAI) field for the cell. In some embodiments, the field includes a counter downlink assignment indicator (C-DAI) field. In some embodiments, the control information includes a downlink control information (DCI).

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:

receiving, by a communication device from a cell, downlink control information (DCI) that includes a field comprising a value;

wherein the field includes a counter downlink assignment indicator (C-DAI) field;

wherein the value indicates a current number of a control channel monitoring occasion that is associated with the cell and is to be monitored by the communication device; and wherein the current number of the control channel monitoring occasion is part of a series of numbers associated with a set of control channel monitoring occasions where control channels are received or are to be received from the cell;

transmitting one or more hybrid automatic repeat request acknowledgement (HARQ-ACK) information bits indicating whether a shared channel associated with the control channel monitoring occasion is received by the communication device or indicating that the communication device received the downlink control information; and receiving a second DCI that includes a second field that includes a second value that indicates a total number of control channel monitoring occasions in the set of control channel monitoring occasions associated with the cell;

wherein the second field for the second value is a total downlink assignment indicator, T-DAI, field for the cell;

wherein the communication device determines a third value of a second T-DAI field based on the second value of the T-DAI field;

wherein the third value of the second T-DAI field indicates a second total number of control channel monitoring occasions in a second set of control channel monitoring occasions that are associated with a second cell and that are to be monitored by the communication device;

wherein the second value is referred as Y and the third value is referred as X; and wherein the transmitting the one or more HARQ-ACK information bits comprises: obtaining a multiplexed HARQ-ACK information bits by multiplexing a plurality of HARQ-ACK information bits that indicate whether a set of shared channels are received by the communication device and/or that the communication device received the DCI, wherein the plurality of HARQ-ACK information bits comprise the one or more HARQ-ACK information bits; and transmitting the multiplexed HARQ-ACK information bits in an uplink shared channel scheduled by the control channel that includes the second field.

2. The method of claim 1, wherein the value in the field indicates the current number of a control channel monitoring occasion that is associated with the cell, and wherein the cell is a scheduling cell for a group of scheduled cells.

3. The method of claim 1, wherein the second value of the second field indicates the total number of control channel monitoring occasions in the set of control channel monitoring occasions associated with the cell that is a reference cell, wherein the communication device determines one or more second values associated with one or more other cells based on the second value of the second field, and wherein each of the one or more second values indicates a total number of control channel monitoring occasions in one set of control channel monitoring occasions associated with one of the one or more other cells.

4. A wireless communication method, comprising:

transmitting, by a network device, downlink control information (DCI) that includes a field comprising a value;

wherein the field includes a counter downlink assignment indicator (C-DAI) field;

wherein the value indicates a current number of a control channel monitoring occasion that is associated with a cell of the network device and is to be monitored by a communication device; and wherein the current number of the control channel monitoring occasion is part of a series of numbers associated with a set of control channel monitoring occasions where control channels are transmitted or are to be transmitted from the cell to the communication device; and receiving one or more hybrid automatic repeat request acknowledgement (HARQ-ACK) information bits indicating whether a shared channel associated with the control channel monitoring occasion is received by the communication device or indicating that the communication device received the downlink control information; and transmitting a second DCI that includes a second field that includes a second value that indicates a total number of control channel monitoring occasions in the set of control channel monitoring occasions associated with the cell;

wherein the second field for the second value is a total downlink assignment indicator, T-DAI, field for the cell;

wherein a third value of a second T-DAI field based on the second value of the T-DAI field;

wherein the third value of the second T-DAI field indicates a second total number of control channel monitoring occasions in a second set of control channel monitoring occasions that are associated with a second cell and that are to be monitored by the communication device; and wherein the second value is referred as Y and the third value is referred as X; and wherein the receiving the one or more HARQ-ACK information bits comprises: receiving multiplexed HARQ-ACK information bits in an uplink shared channel scheduled by the control channel that includes the second field, wherein the multiplexed HARQ-ACK information bits comprise a plurality of HARQ-ACK information bits that indicate whether a set of shared channels are received by the communication device and/or that the communication device received the DCI, and the one or more HARQ-ACK information bits.

5. The method of claim 4, wherein the value in the field indicates the current number of a control channel monitoring occasion that is associated with the cell, and wherein the cell is a scheduling cell for a group of scheduled cells.

6. The method of claim 4, wherein the second value of the second field indicates the total number of control channel monitoring occasions in the set of control channel monitoring occasions associated with the cell that is a reference cell.

7. A wireless communication apparatus, comprising:

a processor configured to:

receive, by a communication device from a cell, downlink control information (DCI) that includes a field comprising a value;

wherein the field includes a counter downlink assignment indicator (C-DAI) field;

wherein the value indicates a current number of a control channel monitoring occasion that is associated with the cell and is to be monitored by the communication device; and wherein the current number of the control channel monitoring occasion is part of a series of numbers associated with a set of control channel monitoring occasions where control channels are received or are to be received from the cell;

transmit one or more hybrid automatic repeat request acknowledgement (HARQ-ACK) information bits indicating whether a shared channel associated with the control channel monitoring occasion is received by the communication device or indicating that the communication device received the downlink control information; and receive a second DCI that includes a second field that includes a second value that indicates a total number of control channel monitoring occasions in the set of control channel monitoring occasions associated with the cell;

wherein the second field for the second value is a total downlink assignment indicator, T-DAI, field for the cell;

wherein the communication device determines a third value of a second T-DAI field based on the second value of the T-DAI field;

wherein the third value of the second T-DAI field indicates a second total number of control channel monitoring occasions in a second set of control channel monitoring occasions that are associated with a second cell and that are to be monitored by the communication device;

wherein the second value is referred as Y and the third value is referred as X; and wherein the transmitting the one or more HARQ-ACK information bits comprises: obtaining a multiplexed HARQ-ACK information bits by multiplexing a plurality of HARQ-ACK information bits that indicate whether a set of shared channels are received by the communication device and/or that the communication device received the DCI, wherein the plurality of HARQ-ACK information bits comprise the one or more HARQ-ACK information bits; and transmitting the multiplexed HARQ-ACK information bits in an uplink shared channel scheduled by the control channel that includes the second field.

8. The wireless communication apparatus of claim 7, wherein the value in the field indicates the current number of a control channel monitoring occasion that is associated with the cell, and wherein the cell is a scheduling cell for a group of scheduled cells.

9. The wireless communication apparatus of claim 7, wherein the second value of the second field indicates the total number of control channel monitoring occasions in the set of control channel monitoring occasions associated with the cell that is a reference cell, wherein the communication device determines one or more second values associated with one or more other cells based on the second value of the second field, and wherein each of the one or more second values indicates a total number of control channel monitoring occasions in one set of control channel monitoring occasions associated with one of the one or more other cells.

10. A wireless communication apparatus, comprising:

a processor configured to:

transmit, by a network device, downlink control information (DCI) that includes a field comprising a value;

wherein the field includes a counter downlink assignment indicator (C-DAI) field;

wherein the value indicates a current number of a control channel monitoring occasion that is associated with a cell of the network device and is to be monitored by a communication device; and wherein the current number of the control channel monitoring occasion is part of a series of numbers associated with a set of control channel monitoring occasions where control channels are transmitted or are to be transmitted from the cell to the communication device;

receive one or more hybrid automatic repeat request acknowledgement (HARQ-ACK) information bits indicating whether a shared channel associated with the control channel monitoring occasion is received by the communication device or indicating that the communication device received the downlink control information; and transmit a second DCI that includes a second field that includes a second value that indicates a total number of control channel monitoring occasions in the set of control channel monitoring occasions associated with the cell;

wherein the second field for the second value is a total downlink assignment indicator, T-DAI, field for the cell;

wherein a third value of a second T-DAI field based on the second value of the T-DAI field;

wherein the third value of the second T-DAI field indicates a second total number of control channel monitoring occasions in a second set of control channel monitoring occasions that are associated with a second cell and that are to be monitored by the communication device;

wherein the second value is referred as Y and the third value is referred as X; and

wherein the receiving the one or more HARQ-ACK information bits comprises: receiving multiplexed HARQ-ACK information bits in an uplink shared channel scheduled by the control channel that includes the second field, wherein the multiplexed HARQ-ACK information bits comprise a plurality of HARQ-ACK information bits that indicate whether a set of shared channels are received by the communication device and/or that the communication device received the DCI, and the one or more HARQ-ACK information bits.

11. The wireless communication apparatus of claim 10, wherein the value in the field indicates the current number of a control channel monitoring occasion that is associated with the cell, and wherein the cell is a scheduling cell for a group of scheduled cells.

12. The wireless communication apparatus of claim 10, wherein the second value of the second field indicates the total number of control channel monitoring occasions in the set of control channel monitoring occasions associated with the cell that is a reference cell.

* * * * *